E. J. SWEDLUND.
MOVING PICTURE MACHINE.
APPLICATION FILED OCT. 21, 1913.
1,124,971.
Patented Jan. 12, 1915.
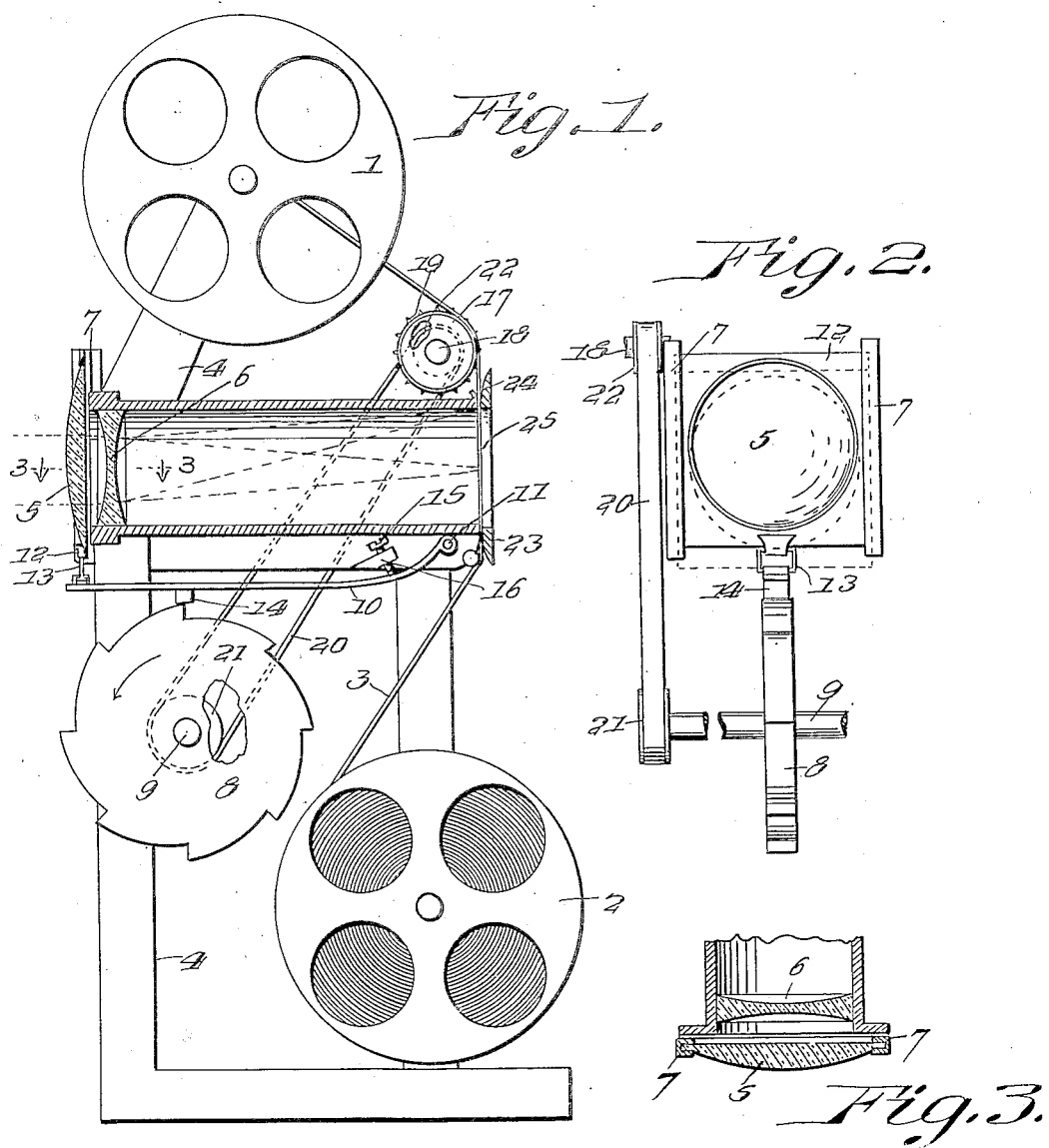
Witnesses
E. R. Bond
R. R. Bond
Inventor
Erick J. Swedlund,
By E. R. Bond
Attorney

UNITED STATES PATENT OFFICE.

ERICK J. SWEDLUND, OF WILLISTON, NORTH DAKOTA.

MOVING-PICTURE MACHINE.

1,124,971.  Specification of Letters Patent.  Patented Jan. 12, 1915.

Application filed October 21, 1913. Serial No. 796,386.

*To all whom it may concern:*

Be it known that I, ERICK J. SWEDLUND, a citizen of the United States of America, and resident of Williston, county of Williams, and State of North Dakota, have invented certain new and useful Improvements in Moving-Picture Machines, of which the following is a specification.

This invention relates to certain new and useful improvements in moving picture machines and it has for its objects among others to provide an improved form of moving picture machine by which the film or pictures move at constant speed so as to relieve the film from strain and wear caused by sudden starts and stops.

The invention has for a further object to provide a machine which, as a result of such movement, will show clearer pictures with less blurring and flickering, the changing of the pictures being effected very quickly.

Still a further object is to provide a machine of simple construction, the mechanism of which shall be quick and positive in its action, so that each picture will be exposed to view in such rapid succession as to appear at exactly the same time and place, thereby eliminating the heretofore jerky movement, and by reason of the rapid changing of the pictures a greater number can be shown per second, thereby obtaining more perfect movements of the pictures. The construction is such that there will be no more strain on the film at high speed than at low speed.

Other objects and advantages of the invention will hereinafter appear and the novel features thereof will be pointed out in the appended claims.

The invention is clearly illustrated in the accompanying drawing, which, with the numerals of reference marked thereon, form a part of this specification, and in which—

Figure 1 is a side elevation, with parts in section and portions broken away, of a moving picture machine embodying my present improvements. Fig. 2 is a front view of the object lens with its ratchet wheel and associated parts. Fig. 3 is a section on the line 3—3 of Fig. 1, looking in the direction of the arrows.

Like numerals of reference indicate like parts throughout the different views.

Referring to the drawings, 1 and 2 designate the reels, 3 the film and 4 the frame or support therefor, all of which may be of any well known or approved form of construction, it being understood that the parts not hereinafter specifically described may be of the conventional form or of any approved form suitable to the purpose.

5 is an object lens, of convex spherical form of suitable refractive power and as a convex lens is composed of an infinite number of prisms with their bases extending to the center of the lens, such a lens when moved in either direction will deflect and move an object in a direction opposite to its own motion. By preference, I employ a convex lens of high refractive power for the moving object lens, and reduce the power by a concave lens as 6 mounted stationarily by the side of the moving object lens, as a high power convex lens requires less motion to move the objects, as the motions are quicker. A lens such as shown at 6 mounted stationarily by the side of the moving convex lens 5 will reduce this motion but very little, but will reduce the refractive power of the convex lens to the extent of the negative dioptric value of the concave lens.

The object lens 5 is mounted in suitable guides or slideways 7 for limited up and down movement, and for imparting this reciprocatory movement to the object lens I may employ any suitable form of mechanism, that shown in the present instance, however, being considered well adapted for the purpose, although it is to be understood that the invention is in no wise restricted to such particular means. This means comprises a ratchet wheel 8 mounted upon a suitable shaft 9 supported in suitable bearings, and a spring 10 secured at one end in any suitable manner as at 11 to some fixed portion of the frame or other stationary member, the other end of the spring being connected with the under side of the frame 12 in which the lens 5 is mounted, the connection in this instance being shown as in the form of a link 13, although other means of connection may be employed, as will be evident. Upon the under side of the spring 10 is a projection 14 in vertical alinement with the ratchet wheel, as seen in Figs. 1 and 2.

If desired, any suitable means may be employed for regulating the tension of the spring, as well as forming a stop for the upward movement thereof and in the present instance I have shown a screw 15 mounted in a suitable lug or bearing 16 on the frame, the screw being adjustable in such lug or support and having one end bearing against the spring adjacent its fixed end 11, as seen in Fig. 1.

17 is a wheel mounted on a suitable shaft 18 supported in any suitable manner, said wheel having the teeth 19 for coöperation with the holes in the film for moving the same. This toothed wheel 17 may be operated from the shaft 9 carrying the ratchet 8 in any suitable manner by gearing or other suitable means; in the present instance, I have chosen to show the same as operated by a chain or belt 20 running on a pulley 21 on the shaft 9 and a pulley 22 on the shaft 18. This, however, is but one of the convenient ways of operating the toothed wheel.

With the parts constructed and arranged substantially as hereinbefore set forth, the operation, briefly stated, is as follows: Supposing the ratchet wheel 8 to be rotating at a constant rate of speed by motor or hand power or other means and the pictures or film moving upward at a constant rate of speed, the object lens 5 will be moved up and down with alternating fast and slow movements. As the ratchet wheel 8 moves in the direction of the arrow shown in Fig. 1, the projection 14 on the spring 10 riding on said wheel, the same will be gradually raised, thus raising the spring 10 upward until the point of each tooth is reached; then the spring snaps back quickly, being unsupported, and the operation will thus be repeated as each tooth of the ratchet wheel comes into play. It will, of course, be understood that this variable forward and backward motion is transmitted to the sliding object lens 5 by means of the connection shown. Fig. 1 clearly illustrates the movement and the result. Supposing the film or pictures to be moving from 23 to 24. At the same time the object lens 5 is moving gradually upward, thus deflecting the picture downward toward 23. The real upward movement of the picture and the apparent downward motion is to have the same speed to neutralize each other, so that the picture as seen through the lens 5 will be motionless at 25 until the spring 10 being relieved of its support by the onward movement of the ratchet wheel 8 snaps back from the top of the tooth by which it was raised to the bottom of the next tooth, and as this spring snaps back the picture will move out of sight toward 24 and the next picture will appear at 23, and as each successive picture on the film is in a slightly further advanced stage, the pictures will appear moving when the change is made quickly. The return or downward movement of the spring 10 and lens 5 will be accomplished in a very small fraction of a second, and owing to the persistence of vision of the human eye the changing of the pictures will not be noticed.

While I prefer to use no shutter as the movement of the spring 10 can be made fast enough so that the eye cannot see any blur in the object, I may some times employ a speed shutter to shut off the light at the time the spring 10 snaps back. I have found, however, that the pictures will appear brighter if the light is not shut off.

It is to be understood that the generic feature of the invention resides in the moving or reciprocating object lens and the constant speed of the film or objects and that the mechanism for moving the object lens and the film can be accomplished in many different ways, that shown being given merely by way of illustration. It is also evident that the invention is subject to changes, variations and modifications in detail, proportion of parts, etc., without departing from the spirit of the invention or sacrificing any of its advantages. I, therefore, do not intend to restrict myself to the particular construction or details hereinbefore disclosed, but reserve the right to make such changes, variations and modifications as come properly within the scope of the protection prayed.

What is claimed as new is:—

1. In a moving picture machine, a stationary concave lens, a convex lens of suitable refractive power for coöperation therewith, and means embodying a rotary member and a resilient member coöperating therewith and permanently connected with said convex lens for moving the same forward and backward by alternate fast and slow movements of the latter.

2. In a moving picture machine, a stationary concave lens, a convex lens of suitable refractive power for coöperation therewith, means positively connected therewith and positively actuated rotary means disconnected from and coöperating with said means and tension means to give said convex lens to and fro movement alternately fast and slow to make a picture that is moving at constant speed appear motionless.

3. In a moving picture machine, a movably mounted reciprocatory object lens disposed at a suitable distance from the moving pictures, and means embodying a pivotally mounted resilient member positively connected with said lens and given a speed to neutralize motion of said moving picture and a rotary member coöperating with said resilient member.

4. In a moving picture machine, an object lens of suitable refractive power reciprocatorily mounted for alternate fast and slow to and fro movements to deflect a picture to either side of a central point, and means pivotally mounted at one end and pivotally connected at the other end with said lens and coöperating with rotary means acting on said pivoted means and moving it in one direction to give the required movements to said lens.

5. In a moving picture machine, a plurality of pictures movable successively at a constant rate of speed, a convex object lens mounted a suitable distance from said objects, and means embodying a resilient member and a rotary member coöperating therewith for imparting a variable reciprocatory motion to said object lens to make said moving pictures appear motionless.

6. In a moving picture machine, a plurality of pictures movable successively at a constant rate of speed, a convex object lens mounted a suitable distance from said pictures, and means embodying a resilient member and a rotary member coöperating therewith for imparting a variable reciprocatory motion to said object lens to make said moving pictures appear motionless, one of said movements being faster than the other to make said moving pictures appear as one at a given point.

7. In a moving picture machine, a plurality of pictures mounted to move successively, means to move said pictures at a constant rate of speed, an object lens of suitable refractive power mounted a suitable distance from said moving pictures, means embodying a resilient member and a rotary member coöperating therewith for imparting continuous forward and back movements to said object lens, said forward and back movements to be of alternately fast and slow duration, the slow movements to have a speed to neutralize the motion of said moving objects to make said moving pictures appear motionless at one place but to have an individual motion of their own, the fast movement of said object lens to have a speed to make said moving pictures invisible to the eye.

8. In a moving picture machine, a plurality of pictures mounted to move successively, and means to move said pictures at a constant rate of speed, a convex object lens mounted to have a continuous forward and back alternately fast and slow motion, a concave lens mounted stationary and parallel with said moving convex lens to neutralize said convex lens to a suitable dioptric power to make said moving pictures appear as one picture at one place and to appear to have an individual motion and means timed with the film moving means and embodying a resilient member positively connected with the lens, and a rotary member coöperating therewith for imparting said fast and slow motions to the object lens.

9. In a moving picture machine, an object lens mounted for variable reciprocatory motion, a pivoted spring member connected with said lens to move the same, a rotary member, and means on said rotary member for intermittent contact with said spring member.

10. In a moving picture machine, an object lens mounted for variable reciprocatory motion, a pivoted spring member connected with said lens to move the same, a rotary member, means on said rotary member for intermittent contact with said spring member, and adjustable means for varying the tension of said spring member.

Signed by me at Williston, N. D. this 17 day of October, 1913.

ERICK J. SWEDLUND.

Witnesses:
O. J. HELLAND,
CARL GAUTHIER.